United States Patent [19]

Barradas

[11] E Re. 30,866

[45] Reissued Feb. 16, 1982

[54] HAIR CURLING IMPLEMENT

[75] Inventor: George Barradas, Glenville, Conn.

[73] Assignee: Sunbeam Corporation (Canada) Limited, Toronto, Canada

[21] Appl. No.: 706,522

[22] Filed: Jul. 19, 1976

Related U.S. Patent Documents

Reissue of:

[64] Patent No.: 3,921,648
Issued: Nov. 25, 1975
Appl. No.: 538,083
Filed: Jan. 2, 1975

[51] Int. Cl.[3] ..... A45D 2/24

[52] U.S. Cl. ..... 132/37 R; 219/225

[58] Field of Search ..... 132/37 R, 31, 32, 33, 132/34, 39, 40, 9; 219/222, 225

[56] References Cited

U.S. PATENT DOCUMENTS 536,839 4/1895 Pitner ..... 219/225
3,224,454 12/1965 Quinio et al. ..... 219/225
3,698,402 10/1972 Arnesen ..... 132/37 R
3,712,310 1/1973 Parlagreco ..... 132/40
3,805,811 4/1974 Dorn ..... 132/37 R

*Primary Examiner*—G. E. McNeill
*Attorney, Agent, or Firm*—Ridout & Maybee

[57] ABSTRACT

A steam curling iron is provided with an expansible mandrel carried on the main curling arm of the iron, the mandrel being constituted by a foraminous screen which can be wound and unwound by manually rotatable means to vary the diameter of the mandrel for different size curls. Steam generated within the curling arm is projected through perforations therein to the interior of the mandrel. Treatment liquid or water is metered in discrete quantities to the curling arm from a reservoir within a handle portion in accordance with the operation of a control button.

*The invention also provides a valve system operated by a button for pumping metered quantities of liquid along the curling arm, and also provides a removable liquid reservoir located in a concealed portion of the handle beneath a closure.*

16 Claims, 8 Drawing Figures

HAIR CURLING IMPLEMENT

Matter enclosed in heavy brackets [ ] appears in the original patent but forms no part of this reissue specification; matter printed in italics indicates the additions made by reissue.

BACKGROUND OF THE INVENTION

This invention relates to hair curling implements, such as curling irons for example, and is concerned particularly with hair curling implements of the type which are used to set or curl hair by the application of steam.

It is an object of the present invention to provide an implement for the setting of curls of different sizes, the implement providing an expansible mandrel onto which the hair is wound and clamped, and means for applying steam to the interior of the mandrel, which is perforated to allow passage of the steam to the hair.

A hair curling implement in accordance with the invention comprises an elongated curling arm, the curling arm having an elongated tubular barrel with a longitudinally extending slot therein; steam generating means mounted within said barrel; a clamping arm pivotally mounted on the curling arm and adapted in the clamped position to cooperate with a longitudinally extending upper region of the barrel; an expansible mandrel constituted by a resilient perforate screen anchored along one longitudinal edge to the barrel and extending through said slot, the perforate screen being looped into a generally cylindrical configuration encircling a longitudinally extending lower region of the barrel, said lower region of the barrel having perforations for the passage of steam from the steam generating means to the interior of the mandrel; a rotary anchoring member mounted within the barrel for rotation about a longitudinal axis, the anchoring member providing a longitudinally extending arm offset from said axis, the screen being anchored along a second longitudinal edge to said arm of the anchoring member; and manually rotatable means mounted on said curling arm and coupled to the anchoring member for rotating the anchoring member whereby to expand or contract the mandrel.

One embodiment of the invention will now be described, by way of example, with reference to the accompanying drawings, in which.

Figure 4:
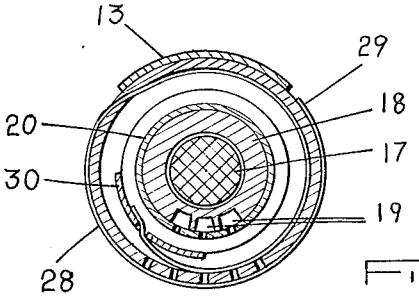
FIG. 4 is a section on line 3—3 in FIG. 2 but showing the expansible mandrel in the fully wound condition.

Referring to the drawings, the hair curling implement comprises a hollow curling arm having an elongated tubular barrel 10 of circular cross section and a hollow handle portion 11 of plastic. The barrel is formed with a longitudinally extending slot 12, the purpose of which will become apparent subsequently. A conventional clamping arm 13 is pivotally mounted on the curling arm, being connected thereto by a pivot pin 14 (FIG. 2), and being spring-biassed to the clamped position by a torsion spring 15. The clamping arm 13 is provided at one end by a plastic handle portion 16, which can be operated by the thumb of a user holding the handle portion 11, for manipulating the clamping arm. As illustrated in FIGS. 3 and 4, the clamping arm 13 is shaped to conform to the cylindrical shape of the barrel 10, and is adapted in the clamped position to cooperate with a longitudinally extending upper region of the barrel.

Extending axially within the tubular barrel 10 is a steam generating assembly comprising an elongated electric resistance heating element 17, this being encased within a metal sheath 18 having a number of grooves or channels 19 extending along the exterior of its lower portion. The encased heating element assembly 17, 18 is in turn encased within a tubular housing 20, the latter being formed with three longitudinal rows of perforations 21 communicating with the grooves 19 so as to permit the passage of steam therefrom to an intermediate annular space or chamber 22 between the housing 20 and the interior surface of the barrel 10. One end of the heated casing 18 is shaped to provide a baffle member 23 of substantially the same outside diameter as the internal diameter of the barrel 10. This baffle member is shaped to provide a labyrinth of channels constituted by a series of interconnected circumferential grooves 24, the labyrinth providing a fluid exit 25 communicating with the longitudinal grooves 19 and a fluid inlet 26 communicating with a flexible supply tube 27.

Figure 7:
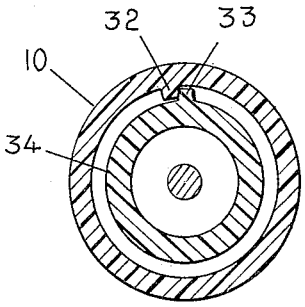
FIG. 7 is a section on line 7—7 in FIG. 1 showing a configuration of parts when the mandrel is in the fully expanded condition.
Figure 8:
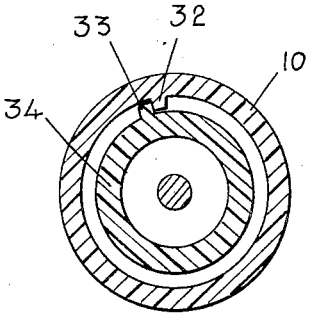
FIG. 8 is a view similar to FIG. 7 but showing the configuration of parts when the mandrel is in the fully wound condition.

The curling arm 10 carries an expansible mandrel 28, which is constituted by a resilient, foraminous screen of stainless steel. The screen is rectangular in shape, having an imperforate peripheral region which bounds the foraminous, steam-pervious central region of the screen, and is of a width corresponding to the length of the slot 12 through which the screen extends. The shorter pair of edges of the rectangular screen extend longitudinally with respect to the tubular barrel 10, one of these edges being anchored to the exterior of the barrel by rivets 29, and the other being anchored to a longitudinally extending arm 30 of a rotary anchoring member 31. The rotary anchoring member 31 is mounted at one end of the barrel 10 for rotation about a longitudinal axis, the arm 30 being offset from the axis. As illustrated in the sectional view of FIGS. 7 and 8, one end of the barrel 10 provides a stop 32 which is engageable with an abutment 33 on the rotary anchoring member to limit rotation of the latter in either direction. The rotary anchoring member 31 is coupled to a manually rotatable member 34 of plastic. The member 34 is mounted at one end of the barrel 10 and connected thereto by a swivel joint so as to be coaxial with the barrel. The foraminous screen is looped into a generally cylindrical configuration, extending from one of its anchored edges to the other, so as to form the mandrel 28. The screen thus encircles a longitudinally extending lower region of the tubular barrel 10, which lower region is formed with rows of perforations 35 to permit the discharge of steam from the chamber 22 to the interior of the mandrel. In order to expand or contract the mandrel 28, the user simply rotates the member 34 in the appropriate direction.

Treatment liquid or water is supplied from a replaceable cartridge 36, forming a reservoir, mounted in the handle portion 11. The cartridge 36 communicates with a deformable container 37 by way of a soft rubber cap 38, and is provided with a one-way valve 39 for controlling the supply of liquid from the cartridge. The deformable container 37 communicates by way of a one-way valve 40 with the tube 27. The handle portion 11 is shaped to provide internal abutments 41 which engage the container. The handle portion 11 also carries a manually engageable push button 42, having an abutment 43 which is adapted to engage the container for deforming the container. Thus, when a user depresses the button 42, a metered discrete quantity of liquid is squeezed out of the container via the valve 40. This liquid passes via the tube 27 into the labyrinth of channels 24 and thence to the grooves 19. The liquid is vaporized, steam issuing from the perforations 21 into the space 22, and from the space 22 to the interior of the mandrel via the openings 35.

Figure 1:
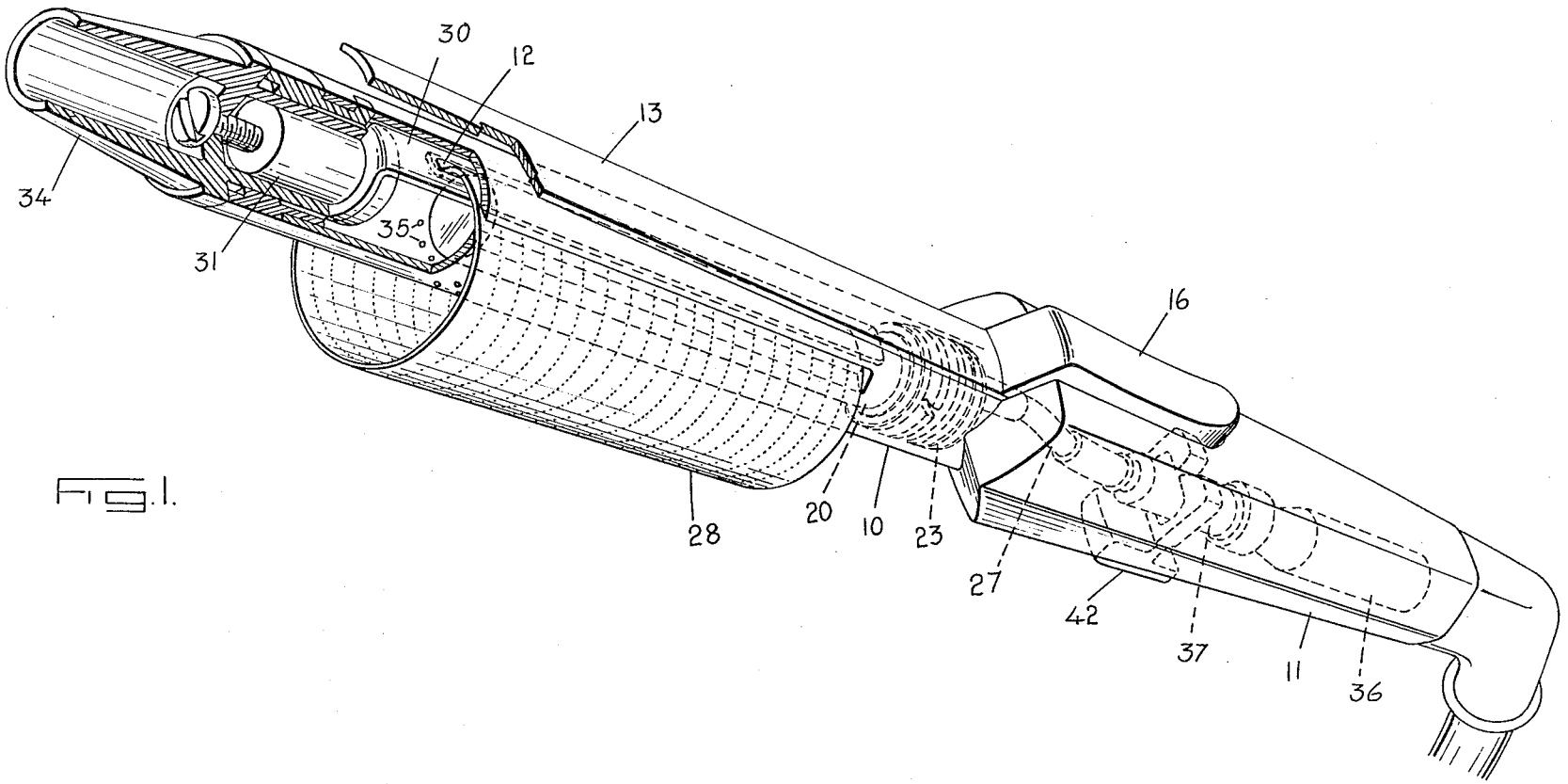
FIG. 1 is a perspective view of the implement, some exterior parts being broken away to show internal structure.
Figure 2:
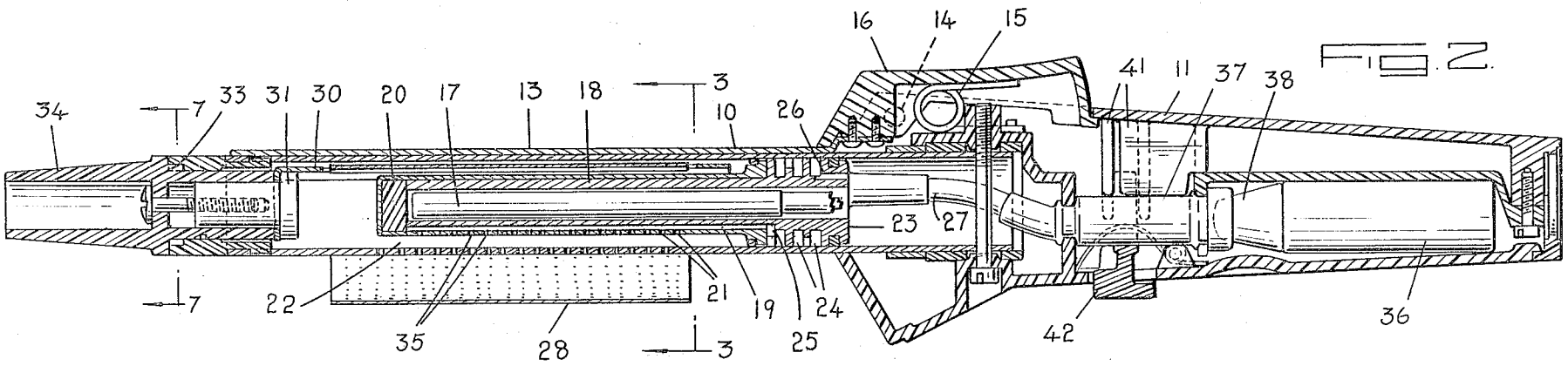
FIG. 2 is a longitudinal sectional view of the implement.
Figure 3:
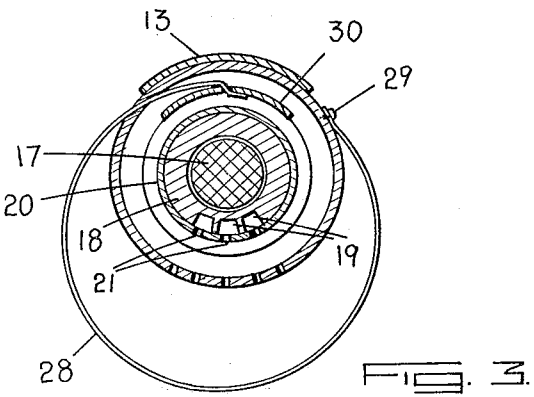
FIG. 3 is a section on line 3—3 in FIG. 2 showing the expansible mandrel in the fully expanded condition.
Figure 5:
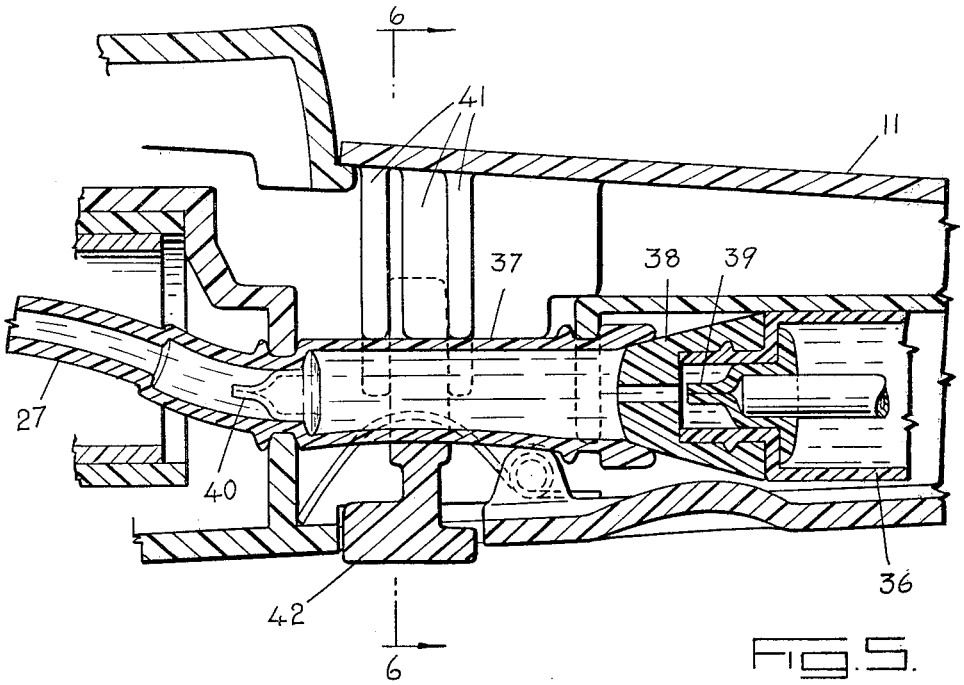
FIG. 5 is an enlarged sectional view of the metering means shown in FIG. 2.
Figure 6:
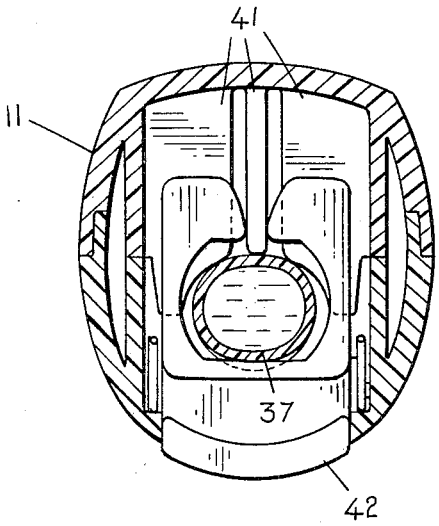
FIG. 6 is a cross section on line 6—6 in FIG. 5.

*As shown in FIG. 2 the handle is provided with a closure 44, concealing the cartridge 36. The closure 44 is hingeably mounted at one end to spring 45. At its other end a lip 46 engages a portion of handle 11. A finger recess 47 in closure 44 permits it to be slid endwise against spring 45 to release lip 46. Spring 45 then swings closure 44 open for access to the interior of the handle.*

What I claim as my invention is:

1. A hair curling implement comprising an elongated curling arm, the curling arm having an elongated tubular barrel with a longitudinally extending slot therein;

steam generating means mounted within said barrel;

a clamping arm pivotally mounted on the curling arm and adapted in the clamped position to cooperate with a longitudinally extending upper region of the barrel;

an expansible mandrel constituted by a resilient perforate screen anchored along one longitudinal edge to the barrel and extending through said slot, the perforate screen being looped into a generally cylindrical configuration encircling a longitudinally extending lower region of the barrel, said lower region of the barrel having perforations for the passage of steam from the steam generating means to the interior of the mandrel;

a rotary anchoring member mounted within the barrel for rotation about a longitudinal axis, the anchoring member providing a longitudinally extending arm offset from said axis, the screen being anchored along a second longitudinal edge to said arm of the anchoring member; and manually rotatable means mounted on said curling arm and coupled to the anchoring member for rotating the anchoring member whereby to expand or contract the mandrel.

2. A hair curling implement according to claim 1, said manually rotatable means being mounted at one end of the barrel and connected thereto by a swivel joint.

3. A hair curling implement according to claim 2, wherein said one end of the barrel provides a stop engageable with an abutment on the rotary anchoring member to limit rotation of the rotary anchoring member in either direction.

4. A hair curling implement according to claim 1, wherein said perforate resilient screen is of rectangular configuration having a width corresponding to the length of said slot and a pair of shorter edges by which it is anchored to the barrel and said arm of the anchoring member, respectively.

5. A hair curling implement according to claim 4, wherein the screen is a foraminous metal screen.

6. A hair curling implement according to claim 5, wherein the screen is of stainless steel.

7. A hair curling implement according to claim 6, wherein the screen has an imperforate peripheral region bounding a foraminous, steam-pervious, central region.

8. A hair curling implement according to claim 1, wherein the steam generating means comprises an enlongated heating element extending axially within said tubular barrel, the heating element being formed with exterior grooves, a tubular housing encasing the heating element and being spaced from the tubular barrel to define therewith an intermediate space, the tubular housing having perforations communicating with the grooves, and means for supplying treatment liquid to the grooves to be vaporized therein into steam.

9. A hair curling implement according to claim 8, including a baffle member mounted at one end of the heating element within said tubular barrel, the baffle member providing a labyrinth of channels having an exit communicating with said grooves in the heating element and an inlet communicating with metering means for metering discrete quantities of treatment liquid thereto.

10. A hair curling implement according to claim 9, said curling arm having a hollow handle portion housing a reservoir for the supply of treatment liquid to the metering means, said metering means being constituted by a deformable container housed within said handle portion, the deformable container having an inlet connected to the reservoir by a first one-way valve and an outlet connected to said labyrinth of channels by a second one-way valve, said handle portion providing internal abutment means engaging the deformable container, and said handle portion carrying a manually engageable abutment member adapted to engage the container for deforming same whereby to meter treatment liquid to said labyrinth of channels.

11. A hair curling implement comprising a hollow curling arm having a hollow handle portion, said curling arm having an elongated tubular barrel with a longitudinally extending slot therein, steam generating means mounted within the tubular body, manually operable metering means mounted within said hollow handle portion and communicating with said steam generating means for metering discrete quantities of treatment liquid thereto, a clamping arm pivotally mounted on said curling arm and adapted in the clamped position to cooperate with a longitudinally extending upper region of said barrel, the clamping arm being spring-biassed to the clamped position, an expansible mandrel constituted by a perforate resilient screen anchored along one longitudinal edge to said tubular barrel and extending through said slot, the resilient screen being looped into a generally cylindrical configuration encircling a lower region of said tubular barrel, said lower region having perforations for the passage of steam from the steam generating means to the mandrel, a rotary anchoring member mounted within said tubular body for rotation about a longitudinal axis, the resilient screen being anchored along a second longitudinal edge to the anchoring member, and a manually rotatable member mounted on one end of the tubular barrel coaxially therewith remote from said handle portion and connected to the barrel by a swivel joint, the rotatable member being coupled to said rotary anchoring member for rotating the anchoring member whereby to expand or contract said mandrel.

*12. A hair curling implement having a hollow curling arm with a handle portion, the curling arm having an elongated tubular barrel, and containing steam generating means therein, and there being opening means therein for release of steam therefrom for treatment of the hair, the improvement comprising;*

*liquid reservoir means mounted in said handle portion, and having an outlet;*

*one-way valve means communicating with said outlet of said reservoir means and permitting withdrawal of liquid from said reservoir means, but resisting re-entry of liquid therein;*

*a deformable container in said handle communicating at one end with said reservoir means through said one-way valve means, a second one-way valve means at the other end of said deformable container, permitting exit of liquid therefrom, and resisting return of liquid therethrough, said deformable container being adapted to be compressed, and manually operable means for compressing said deformable container, release of said manually operable means permitting dilation of said deformable container, and,*

*a supply tube communicating between said second one-way valve means and said steam generating means for carrying liquid from said deformable container to said steam generating means in response to operation of said manually operable means.*

*13. The hair curling implement as claimed in claim 12 and including a soft rubber cap on one end of said liquid reservoir means around said one-way valve means, said cap being shaped and dimensioned to fit within said one end of said deformable container, whereby to provide a good seal therebetween.*

*14. The hair curling implement as claimed in claim 12 including abutment means within said handle portion, said deformable container resting against said abutment means, and said container being formed in an elongated tubular shape of deformable material, and said manually operable means comprising a button accessible from the exterior of said handle means, and movable relative to said abutment means to and fro to compress said deformable container thereagainst, and said container being resilient and returning said button to its normal position when released.*

*15. A hair curling implement having a hollow curling arm with a hollow handle portion, the curling arm having an elongated tubular barrel and containing steam generating means therein, and there being opening means therein for release of steam therefrom for treatment of the hair and having a supply tube for communicating liquid to said steam generating means, the improvement comprising;*

*replaceable liquid reservoir means of elongated tubular shape shaped to fit within said hollow handle portion and being adapted to communicate with said supply tube for delivery of liquid to said steam generating means in said curling arm, and openable closure means hingedly mounted on said handle portion and providing access to said reservoir means, further including hinge means at one end of said closure means, spring means connected with said hinge means, and with said handle, and including engaging means at the other end of said closure means for engaging with a portion of said handle and securing said closure means in the closed position.*

*16. A hair curling implement as claimed in claim 15 wherein said closure means is longitudinally movable against said spring means, and including a finger recess in said closure means whereby the same may be moved against said spring means as aforesaid.*

* * * * *